(12) United States Patent
Kuwamura et al.

(10) Patent No.: US 10,316,675 B2
(45) Date of Patent: Jun. 11, 2019

(54) TURBINE

(71) Applicant: MITSUBISHI HITACHI POWER SYSTEMS, LTD., Yokohama-shi, Kanagawa (JP)

(72) Inventors: Yoshihiro Kuwamura, Tokyo (JP); Hiroharu Oyama, Yokohama (JP); Yoshinori Tanaka, Yokohama (JP); Hideaki Sugishita, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 140 days.

(21) Appl. No.: 15/543,265

(22) PCT Filed: Dec. 16, 2015

(86) PCT No.: PCT/JP2015/085211
§ 371 (c)(1),
(2) Date: Jul. 13, 2017

(87) PCT Pub. No.: WO2016/117246
PCT Pub. Date: Jul. 28, 2016

(65) Prior Publication Data
US 2017/0370237 A1 Dec. 28, 2017

(30) Foreign Application Priority Data

Jan. 22, 2015 (JP) ................. 2015-010635

(51) Int. Cl.
*F01D 11/00* (2006.01)
*F01D 11/02* (2006.01)
(Continued)

(52) U.S. Cl.
CPC ............ *F01D 11/001* (2013.01); *F01D 11/02* (2013.01); *F01D 11/08* (2013.01); *F16J 15/4472* (2013.01);
(Continued)

(58) Field of Classification Search
CPC ........ F01D 11/001; F01D 11/02; F01D 11/08; F16J 15/4472; F05D 2250/70; F05D 2240/55; F05D 2220/31
See application file for complete search history.

(56) References Cited

U.S. PATENT DOCUMENTS 4,545,725 A 10/1985 Ikeda et al.
4,662,820 A * 5/1987 Sasada .................. F04D 29/161
415/173.6
(Continued)

FOREIGN PATENT DOCUMENTS

CN 102695849 A 9/2012
CN 102865108 A 1/2013
(Continued)

OTHER PUBLICATIONS

Office Action dated May 11, 2018, issued in counterpart Korean application No. 10-2017-7019840, with English translation. (8 pages).
(Continued)

*Primary Examiner* — Thomas N Moulis
(74) *Attorney, Agent, or Firm* — Westerman, Hattori, Daniels & Adrian, LLP

(57) ABSTRACT

A seal device of a turbine includes: at least one step surface disposed on a radially outer surface of a rotor blade facing a first radial-directional gap or on an outer peripheral surface of a rotor facing a second radial-directional gap, the at least one step surface facing upstream in a flow direction of a fluid and dividing the radially outer surface of the rotor blade or the outer peripheral surface of the rotor into at least two sections in an axial direction of the rotor; at least two seal fins protruding toward the at least two sections, respectively, from a surrounding member or the stationary vane, and facing the at least two sections via a seal gap, respectively,
(Continued)

the at least two seal fins forming a cavity which extends over the at least one step surface in the axial direction of the rotor between each other.

19 Claims, 10 Drawing Sheets

(51) Int. Cl.
  *F01D 11/08* (2006.01)
  *F16J 15/447* (2006.01)
(52) U.S. Cl.
  CPC ...... *F05D 2220/31* (2013.01); *F05D 2240/55* (2013.01); *F05D 2250/70* (2013.01)

(56) References Cited

U.S. PATENT DOCUMENTS

| | | | |
|---|---|---|---|
| 5,639,095 A * | 6/1997 | Rhode | F16J 15/4472 277/303 |
| 7,445,213 B1 | 11/2008 | Pelfrey | |
| 9,631,510 B2 * | 4/2017 | Lim | F02C 7/28 |
| 2009/0072487 A1 * | 3/2009 | Chougule | F01D 11/001 277/412 |
| 2011/0002777 A1 * | 1/2011 | Smith | F01D 5/225 415/176 |
| 2011/0236189 A1 * | 9/2011 | Ono | F01D 11/005 415/174.5 |
| 2012/0121393 A1 | 5/2012 | Kuwamura et al. | |
| 2012/0288360 A1 * | 11/2012 | Kuwamura | F01D 5/225 415/173.1 |
| 2013/0129493 A1 * | 5/2013 | Matsumoto | F01D 5/225 415/191 |
| 2013/0149118 A1 * | 6/2013 | Lotfi | F01D 11/02 415/174.5 |
| 2013/0189087 A1 | 7/2013 | Spracher et al. | |
| 2013/0251534 A1 * | 9/2013 | Matsumoto | F01D 5/147 416/223 R |
| 2013/0272855 A1 * | 10/2013 | Kuwamura | F01D 11/10 415/173.5 |
| 2014/0154061 A1 | 6/2014 | Kuwamura et al. | |
| 2016/0024954 A1 | 1/2016 | Zheng et al. | |
| 2016/0130965 A1 * | 5/2016 | Yamaguchi | F01D 1/04 415/13 |
| 2016/0333714 A1 * | 11/2016 | Matsumoto | F01D 11/08 |
| 2017/0022838 A1 * | 1/2017 | Kuwamura | F01D 11/02 |
| 2018/0058232 A1 * | 3/2018 | Oikawa | F01D 5/02 |
| 2018/0355743 A1 * | 12/2018 | Nishikawa | F01D 5/20 |
| 2018/0355979 A1 * | 12/2018 | Nishikawa | B24B 9/00 |
| 2018/0371927 A1 * | 12/2018 | Kuwamura | F01D 11/001 |

FOREIGN PATENT DOCUMENTS

| | | |
|---|---|---|
| CN | 204041127 U | 12/2014 |
| EP | 2 280 149 A1 | 2/2011 |
| JP | 59-134302 A | 8/1984 |
| JP | 2000-73702 A | 3/2000 |
| JP | 2003-343207 A | 12/2003 |
| JP | 2011-80452 A | 4/2011 |
| JP | 2011-208602 A | 10/2011 |
| JP | 2012-72689 A | 4/2012 |
| JP | 2013-19537 A | 1/2013 |
| JP | 2014-55588 A | 3/2014 |
| JP | 5518022 B | 4/2014 |
| JP | 2015-169077 A | 9/2015 |
| KR | 20120092161 A | 8/2012 |

OTHER PUBLICATIONS

Office Action dated Mar. 30, 2018, issued in counterpart Japanese Application No. 2015-010635, with English translation (6 pages).
Search Report dated Mar. 22, 2016. issued in International Application No. PCT/JP2015/085211 (11 pages).
International Preliminary Report on Patentability (Form PCT/IB/338) issued in counterpart International Application No. PCT/JP2015/085211 dated Aug. 3, 2017, with PCT/IB/373, PCT/ISA/237, PCT/IB/326, with English translation (16 pages).
Office Action dated Oct. 26, 2018, issued in counterpart Japanese application No. 2015-010635, with English translation. (7 pages).
Office Action dated Sep. 4, 2018, issued in counterpart Chinese application No. 201580073874.2, with English translation. (13 pages).

* cited by examiner

TURBINE

TECHNICAL FIELD

The present disclosure relates to a turbine.

BACKGROUND ART

Steam turbines and gas turbines are normally provided with a seal device capable of restricting a flow of a fluid in clearance between a stationary member and a rotational member, that is, for instance, clearance between rotor blades and members surrounding rotor blades or clearance between stationary vanes and a rotor.

For instance, JP5518022B discloses a seal device of a steam turbine provided with a step portion disposed on a tip portion of a blade and a seal fin disposed on a structural body. The step portion has at least one step surface facing the upstream side and protrudes toward the structural body. The seal fin extends toward the step portion and forms minute clearance between the seal fin and the step portion.

With the above seal device of a steam turbine, a separation vortex and a main vortex are formed on the upstream side of the seal fin, and the flow contraction effect of the separation vortex reduces leakage of steam that flows through the minute clearance.

SUMMARY

Problems to be Solved

An object of at least one embodiment of the present embodiment is to provide a turbine provided with an improved seal device capable of reducing a leakage flow better than a typical seal device.

Solution to the Problems

The present inventors conducted extensive researches to achieve the above object, and found that a main vortex and a separation vortex have the optimum vortex structure in a cavity between seal fins when a flow site of the cavity is uniform in the circumferential direction of a rotor. Further, the present inventors found that optimizing the vortex structure maximizes the strength of the separation vortex in the meridional plane, and improves the sealing performance.

Furthermore, the present inventors found that, in reality, a velocity change (secondary flow) in the circumferential direction may occur in the cavity to reduce the kinetic energy of the fluid in the meridional plane, resulting in weaker main vortex and separation vortex than expectation. The center positions of the main vortex and the separation vortex may heave in the circumferential direction and the vortex structure may break. It was also found that the above tendency is stronger when the seal fins are inclined with respect to the radial direction of the rotor. Further, it was also found that the above tendency is stronger when the absolute circumferential velocity of the fluid flowing into the cavity is close to zero.

On the basis of the above findings, the present inventors conducted further researches, and found a configuration capable of forming a flow site in the cavity between the seal fins uniformly in the circumferential direction of the rotor, thus arriving at the present invention.

(1) A turbine according to at least one embodiment of the present invention comprises: a casing; a rotor extending inside the casing; a plurality of rotor blades fixed to the rotor and arranged in a circumferential direction of the rotor; a surrounding portion fixed to the casing and surrounding the plurality of rotor blades via a first radial-directional gap; a plurality of stationary vanes fixed to the casing and arranged in the circumferential direction of the rotor so as to have a second radial-directional gap from an outer peripheral surface of the rotor; and a seal device capable of restricting a flow of a fluid in the first radial-directional gap or the second radial-directional gap. The seal device includes: at least one step surface disposed on a radially outer surface of the rotor blade facing the first radial-directional gap or on the outer peripheral surface of the rotor facing the second radial-directional gap, the at least one step surface facing upstream in a flow direction of the fluid and dividing the radially outer surface of the rotor blade or the outer peripheral surface of the rotor into at least two sections in an axial direction of the rotor; at least two seal fins protruding toward the at least two sections, respectively, from the surrounding member or the stationary vane, and facing the at least two sections via a seal gap, respectively, the at least two seal fins forming a cavity which extends over the at least one step surface in the axial direction of the rotor between each other; and a separation enhancing portion disposed on a downstream surface of the seal fin in the flow direction of the fluid and configured to separate the flow of the fluid along the downstream surface.

With the above turbine (1), the separation enhancing portion disposed on the downstream surface of the seal fin determines the separation point at which the flow of the fluid along the downstream surface of the seal fin separates. The position of the separation point in the meridional plane is determined, and thereby variation of the position of the separation point in the circumferential direction is prevented, and a velocity change (secondary flow) in the circumferential direction in the cavity between the seal fins is suppressed. As a result, the flow site of the cavity becomes uniform in the circumferential direction, and it is possible to strengthen the main vortex and the separation vortex in the cavity, thereby improving the contraction-flow effect and reducing the leakage flow through the seal gap.

(2) In some embodiments, in the above configuration (1), relationships expressed by following two expressions $$0 < x \leq W/2$$

$$t \leq y \leq R/2$$

are satisfied, provided that, W is a distance along the axial direction of the rotor, from a tip of the downstream surface of the seal fin to a farthest portion of the cavity in the axial direction, R is a distance along a radial direction of the rotor, from the tip of the downstream surface of the seal fin to a farthest portion of the cavity in the radial direction, t is a thickness at the tip of the seal fin, x is a distance along the axial direction of the rotor, from the tip of the downstream surface of the seal fin to a shape change point of the separation enhancing portion which causes separation of the flow of the fluid, and y is a distance along the radial direction of the rotor, from the tip of the downstream surface of the seal fin to the shape change point of the separation enhancing portion.

With the above turbine (2), the distance x is less than a half of the distance W, and the distance y is less than a half of the distance R. Accordingly, the separation enhancing portion can cause separation of the flow of the fluid along the downstream surface of the seal fin, without preventing generation of the main vortex and the separation vortex in the cavity. As a result, it is possible to maximize the strength of the main vortex and the separation vortex in the cavity, thereby improving the contraction-flow effect and reducing the leakage flow through the seal gap.

(3) In some embodiments, in the above configuration (1) or (2), the separation enhancing portion is disposed on the downstream surface of the seal fin, and comprises a backward step surface which faces a protruding direction of the seal fin.

With the above configuration (3), with the backward step surface, it is possible to separate the flow of the fluid along the downstream surface of the seal fin.

(4) In some embodiments, in the above configuration (3), a relationship expressed by a following expression $$0.5 \leq h/t \leq 10$$

is satisfied, provided that, t is a thickness at a tip of the seal fin, and h is a height of the backward step surface.

With the above configuration (4), the ratio h/t of the height h of the backward step surface to the thickness t at the tip of the seal fin is not less than 0.5, and thus the flow of the fluid can feel the presence of the backward step surface, which makes it possible to separate the flow of the fluid reliably at the backward step surface. Furthermore, with the ratio h/t being not more than 10, it is possible to suppress pressure loss due to separation, and to prevent a decrease in the strength of the main vortex and the separation vortex.

(5) In some embodiments, in the above configuration (1) or (2), the separation enhancing portion comprises a thread member fixed to the downstream surface of the seal fin.

With the above configuration (5), it is possible to separate the flow of the fluid along the downstream surface of the seal fin with the thread member.

(6) In some embodiments, in the above configuration (5), a relationship expressed by a following expression $$0.5 \leq \varphi/t \leq 10$$

is satisfied, provided that, t is a thickness at a tip of the seal fin, and $\varphi$ is a diameter of the thread member.

With the above configuration (6), the ratio $\varphi$/t of the diameter $\varphi$ of the thread member to the thickness t at the tip of the seal fin to is not less than 0.5, and thus the flow of the fluid can feel the presence of the thread member, which makes it possible to separate the flow of the fluid reliably at the thread member. Furthermore, with the ratio $\varphi$/t being not more than 10, it is possible to suppress pressure loss due to separation, and to prevent a decrease in the strength of the main vortex and the separation vortex.

(7) In some embodiments, in the above configuration (1) or (2), the separation enhancing portion comprises a bend portion at which a root side and a tip side of the downstream surface of the seal fin intersect with each other at different gradients from each other.

With the above configuration (7), it is possible to separate the flow of the fluid along the downstream surface of the seal fin with the bend portion.

(8) In some embodiments, in the above configuration (7), at the bend portion, the root side and the tip side of the downstream surface of the seal fin intersect with each other at an angle of not less than 7° and not more than 45°.

With the above configuration (8), the root side and the tip side of the downstream surface of the seal fin intersect with each other at the bend portion at an angle of not less than 7°, and thus the flow of the fluid can feel the presence of the bend portion, which makes it possible to separate the flow of the fluid reliably at the bend portion. Furthermore, with the angle being not more than 45°, it is possible to suppress pressure loss due to separation, and to prevent a decrease in the strength of the main vortex and the separation vortex.

(9) In some embodiments, in the above configuration (1) or (2), the separation enhancing portion comprises a protrusion protruding from the downstream surface of the seal fin.

With the above configuration (9), it is possible to separate the flow of the fluid along the downstream surface of the seal fin with the protrusion.

(10) In some embodiments, in the above configuration (9), relationships expressed by following two expressions $$0.5 \leq w/t$$

$$0.5 \leq h/t \leq 10$$

are satisfied, provided that, t is a thickness at a tip of the seal fin, w is a length of the protrusion along the downstream surface of the seal fin, and h is a protruding height of the protrusion from the downstream surface of the seal fin.

With the above configuration (10), the ratio w/t of the length w of the protrusion to the thickness t at the tip of the seal fin is not less than 0.5 and the ratio h/t of the protruding height h of the protrusion to the thickness t at the tip of the seal fin is not less than 0.5, and thus the flow of the fluid can feel the presence of the protrusion, which makes it possible to separate the flow of the fluid reliably at the protrusion. Furthermore, with the ratio h/t being not more than 10, it is possible to suppress pressure loss due to separation, and to prevent a decrease in the strength of the main vortex and the separation vortex.

(11) In some embodiments, in the above configuration (1) or (2), the separation enhancing portion comprises a groove which has an opening on the downstream surface of the seal fin.

With the above configuration (11), it is possible to separate the flow of the fluid along the downstream surface of the seal fin with the groove.

(12) In some embodiments, in the above configuration (11), relationships expressed by following two expressions $$h \leq w$$

$$0.5 \leq h/t \leq 10$$

are satisfied, provided that, t is a thickness at a tip of the seal fin, w is a width of the opening of the groove along the downstream surface of the seal fin, and h is a depth of the groove.

With the above configuration (12), the width w of the opening of the groove is not less than the depth h of the groove, and the ratio h/t of the depth h of the groove to the thickness t at the tip of the seal fin is not less than 0.5, and thus the flow of the fluid can feel the presence of the groove, which makes it possible to separate the flow of the fluid reliably at the groove. Furthermore, with the ratio h/t being not more than 10, it is possible to suppress pressure loss due to separation, and to prevent a decrease in the strength of the main vortex and the separation vortex.

(13) In some embodiments, in the above configuration (1) or (2), the separation enhancing portion comprises a recessed portion formed on the downstream surface of the seal fin.

With the above configuration (13), it is possible to separate the flow of the fluid along the downstream surface of the seal fin with the recessed portion.

(14) In some embodiments, in the above configuration (13), a wall surface of the recessed portion and a tip side of the seal fin intersect with each other at an angle of not less than 7°.

With the above configuration (14), the wall surface of the recessed portion and the tip side of the seal fin intersect with each other at an angle of not less than 7°, and thereby the flow of the fluid can feel the presence of the boundary between the wall surface of the recessed portion and the tip side of the seal fin, which makes it possible to separate the flow of the fluid reliably with the recessed portion.

Furthermore, if the flow path width of the fluid flowing toward the tip of the seal fin along the downstream surface of the seal fin increases gradually, the velocity of the fluid flowing along the downstream surface gradually decreases. When the velocity of the fluid is low, the separation point is not stable, and a pressure gradient is likely to be created in the circumferential direction inside the cavity. As a result, the secondary flow in the circumferential direction occurs.

In this regard, with the above configuration (14), the recessed portion is formed on the downstream surface of the seal fin, and thereby the increasing rate of the flow path width of the fluid flowing toward the tip of the seal fin along the downstream surface can be reduced, which makes it possible to suppress reduction of the flow velocity. Accordingly, formation of an uneven pressure gradient in the circumferential direction inside the cavity is suppressed, and thus generation of the secondary flow in the circumferential direction is suppressed, which makes it possible to prevent a decrease in the strength of the main vortex and the separation vortex inside the cavity.

(15) In some embodiments, in the above configuration (1) or (2), the separation enhancing portion is disposed on the downstream surface of the seal fin, and comprises a forward step surface facing an opposite direction to a protruding direction of the seal fin. With the above configuration (15), it is possible to separate the flow of the fluid along the downstream surface of the seal fin with the forward step surface.

(16) In some embodiments, in the above configuration (15), a relationship expressed by a following expression $$0.5 \leq h/t \leq 10$$

is satisfied, provided that, t is a thickness at a tip of the seal fin, and h is a height of the forward step surface.

With the above configuration (16), the ratio $h/t$ of the height h of the forward step surface to the thickness t at the tip of the seal fin is not less than 0.5, and thus the flow of the fluid can feel the presence of the forward step surface, which makes it possible to separate the flow of the fluid reliably at the forward step surface. Furthermore, with the ratio $h/t$ being not more than 10, it is possible to suppress pressure loss due to separation, and to prevent a decrease in the strength of the main vortex and the separation vortex.

(17) In some embodiments, in the above configuration (1) or (2), the separation enhancing portion comprises an inclined surface disposed on the downstream surface of the seal fin and inclined so that a tip side of the seal fin is thinner than a root side of the seal fin.

With the above configuration (17), it is possible to separate the flow of the fluid along the downstream surface of the seal fin with the inclined surface.

(18) In some embodiments, in the above configuration (17), an inclination angle of the inclined surface is not less than 7° and not more than 45°.

With the above configuration (18), the inclination angle of the inclined surface is not less than 7°, and the flow of the fluid can feel the presence of the inclined surface, which makes it possible to separate the flow of the fluid reliably at the inclined surface. Furthermore, with the inclination angle being not more than 45°, it is possible to suppress pressure loss due to separation, and to prevent a decrease in the strength of the main vortex and the separation vortex.

(19) In some embodiments, in any one of the above configurations (1) to (18), the seal fin extends inclined with respect to the radial direction of the rotor.

With the above configuration (19), the seal fin is inclined with respect to the radial direction of the rotor, and thereby the flow-contraction effect is increased, which makes it possible to further reduce a leakage flow of the fluid flowing through the seal gap.

Furthermore, if the seal fin is inclined with respect to the radial direction of the rotor, the flow path width of the fluid flowing toward the tip of the seal fin along the downstream surface of the seal fin increases gradually, and the velocity of the fluid gradually decreases. When the velocity of the fluid is low, the separation point is not stable, and a pressure gradient is likely to be created in the circumferential direction inside the cavity. As a result, the secondary flow in the circumferential direction occurs.

Furthermore, the seal fin is inclined with respect to the radial direction of the rotor, and thereby the aspect ratio inside the cavity increases, so that the main vortex inside the cavity has a shape elongated in the radial direction. A main vortex having an elongated shape has a characteristic to become closer to a true circular shape. Thus, the center of the main vortex is likely to move and the vortex structure tends to be unstable.

In this regard, with the above configuration (19), the separation point is determined by the separation enhancing portion, and thereby the vortex structure in the meridional plane is stabilized, which suppresses creation of an uneven pressure gradient in the circumferential direction, and prevents occurrence of the secondary flow in the circumferential direction. Accordingly, it is possible to fully benefit from the merit of increasing the flow-contraction effect with the seal fin inclined with respect to the radial direction of the rotor, thus reducing a leakage flow.

Advantageous Effects

According to at least one embodiment of the present embodiment, provided is a turbine provided with an improved seal device capable of reducing a leakage flow better than a typical seal device.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
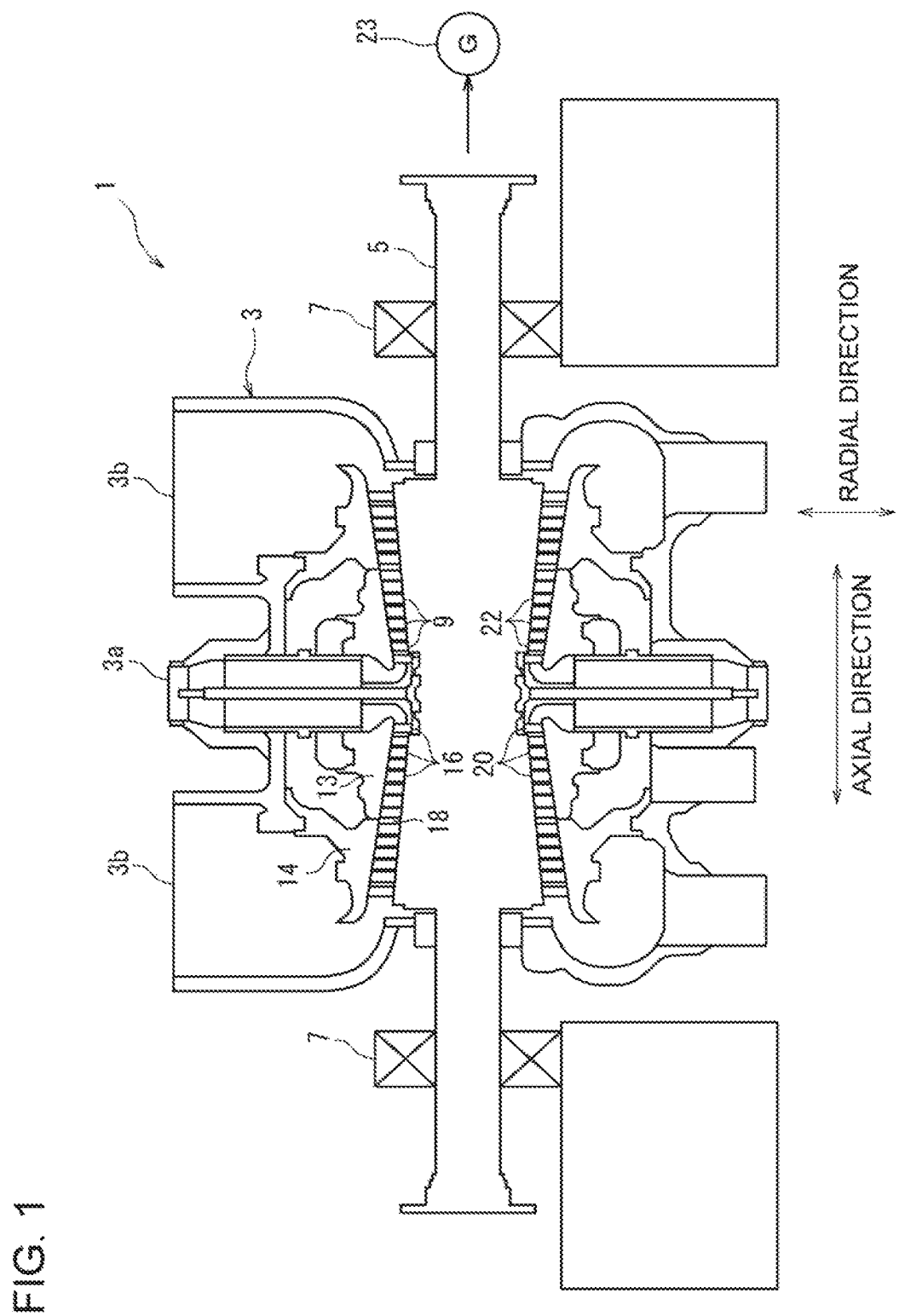
FIG. 1 is a schematic cross-sectional view of a schematic configuration of a turbine according to an embodiment of the present invention.

FIG. 1 is a schematic cross-sectional view of a configuration of the turbine 1 according to an embodiment of the present invention. The turbine 1 is a mid-pressure steam turbine, including a casing 3 and a rotor 5. The casing 3 surrounds an intermediate portion of the rotor 5, and the opposite end portions of the rotor 5 are rotatably supported by a radial bearing 7.

The turbine 1 is an axial-flow turbine, and a plurality of rotor blade rows 9 are fixed to the rotor 5 at distance from one another in the axial direction of the rotor 5 (hereinafter, also referred to as merely axial direction). Furthermore, a plurality of stationary vane rows 16 are fixed to the casing 3 via blade rings 13, 14, at distance from one another in the axial direction.

An inner flow passage 18 having a cylindrical shape is formed between the blade rings 13, 14 and the rotor 5, and the stationary vane rows 16 and the rotor blade rows 9 are disposed in the inner flow passage 18. Each stationary vane row 16 includes a plurality of stationary vanes 20 arranged in the circumferential direction of the rotor 5 (hereinafter, also referred to as merely the circumferential direction), and each stationary vane 20 is fixed to the blade rings 13, 14. Each rotor blade row 9 includes a plurality of rotor blades (turbine rotor blades) 22 arranged in the circumferential direction, and each rotor blade 22 is fixed to the rotor 5. At each stationary vane row 16, the speed of the flow of steam is increased. At each rotor blade row 9, the energy of the steam is converted into rotational energy of the rotor 5. The rotor 5 is connected to a generator 23, for instance, and the generator 23 is driven by the rotor 5.

The casing 3 has a steam inlet 3a at the center in the axial direction, and two steam outlets 3b on both sides of the steam inlet 3a, the turbine 1 thus being a double-flow exhaust type turbine. Thus, inside the casing 3, two inner flow passages 18 are formed so as to extend in opposite directions from each other from the center with respect to the axial direction.

Figure 2:
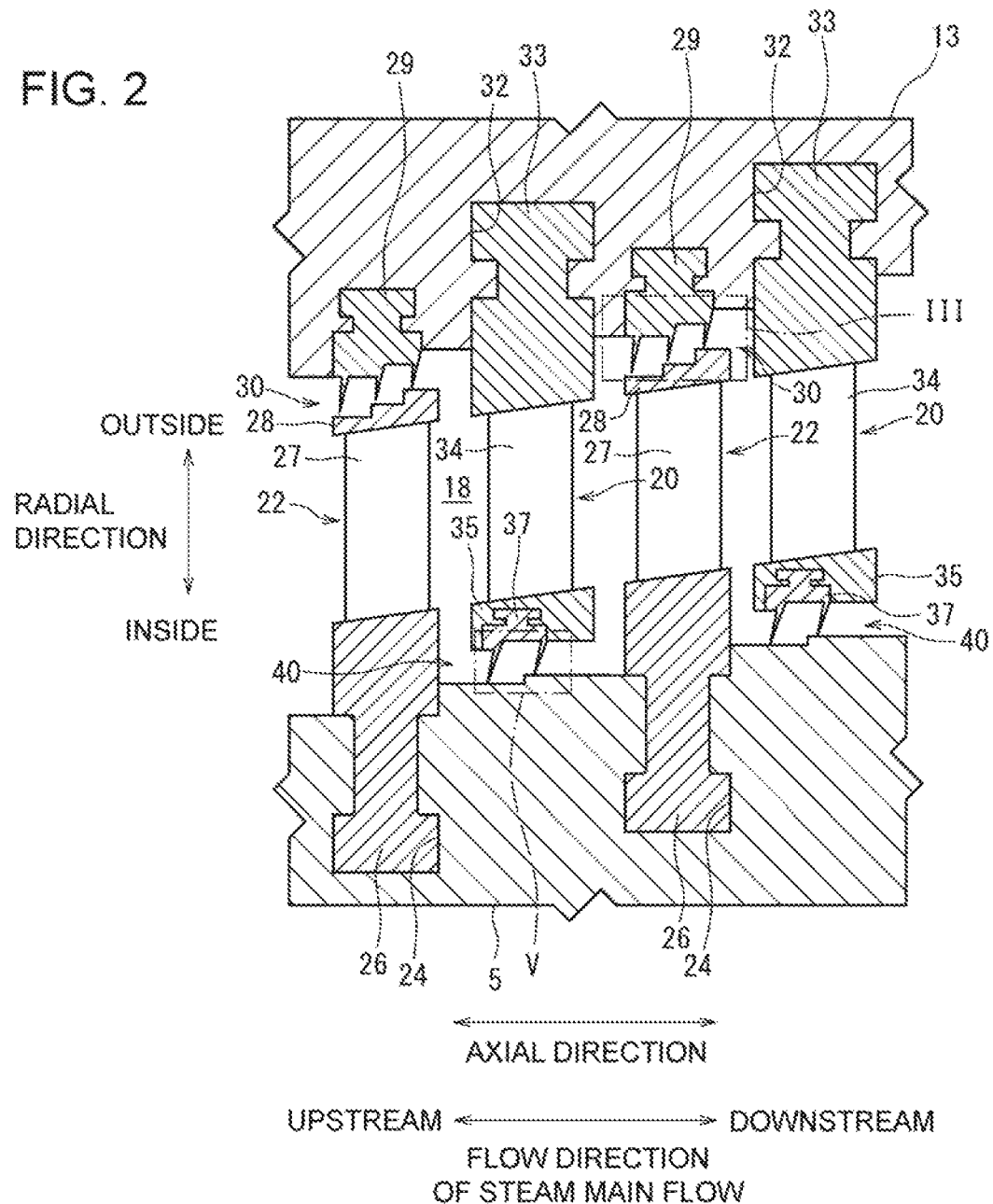
FIG. 2 is an enlarged meridional cross-sectional view schematically showing a part of FIG. 1.

FIG. 2 is an enlarged meridional cross-sectional view schematically showing a part of FIG. 1. Specifically, FIG. 2 shows two stationary vanes 20, 20 that belong to different stationary vane rows 16, and two rotor blades 22, 22 disposed next to the stationary vanes 20, 20, along with the rotor 5 and the blade ring 13.

As shown in FIG. 2, blade grooves 24 extending in the circumferential direction are formed on the rotor 5. The rotor blade 22 has a blade root portion 26, a blade body (blade profile portion) 27, and a shroud (tip shroud portion) 28 formed integrally with one another. The blade root portion 26 is fitted into the blade groove 24, and the rotor blade 22 is fixed to the rotor 5. A seal member 29 is mounted to a section of the blade ring 13 that faces the shroud 28 of the rotor blade 22, and forms a part of a seal device 100 capable of restricting a leakage flow in the radial-directional clearance (first radial-directional clearance) between the shroud 28 and the blade ring 13.

The rotor 5 and the rotor blades 22 may also be collectively referred to as a rotor assembly.

Further, as shown in FIG. 2, the blade ring 13 has a vane groove 32 extending in the circumferential direction. Furthermore, the stationary vane 20 has a vane root portion 33, a vane body (vane profile portion) 34, and a shroud (hub shroud portion) 35 formed integrally with one another. The vane root portion 33 is fitted into the vane groove 32, and thereby the stationary vane 20 is fixed to the blade ring 13, and to the casing 3 via the blade ring 13. A seal member 37 is mounted to the shroud 35 of the stationary vane 20, and forms a part of a seal device 200 capable of restricting a leakage flow in the radial-directional clearance (second radial-directional clearance) between the shroud 35 and the rotor 5.

Figure 3:
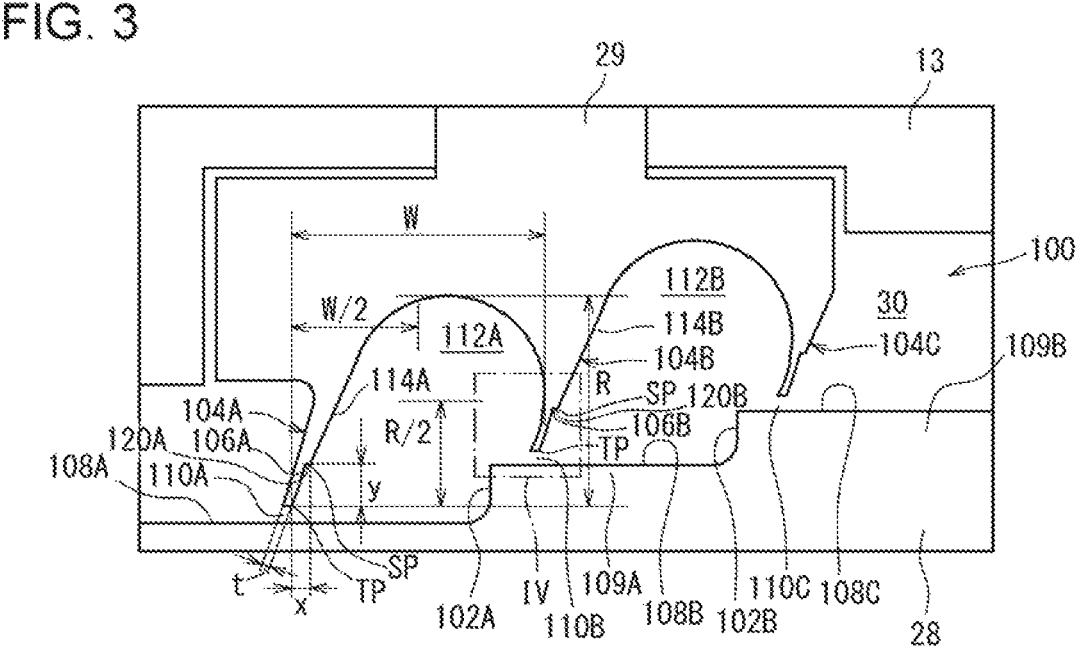
FIG. 3 is an enlarged meridional cross-sectional view schematically showing region III in FIG. 2.
Figure 4:
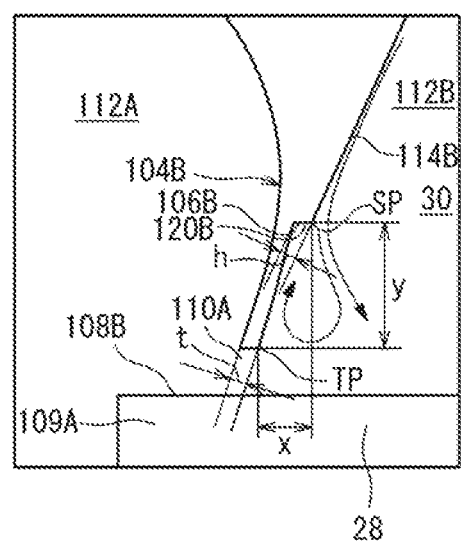
FIG. 4 is an enlarged view of region IV in FIG. 3.
Figure 5:
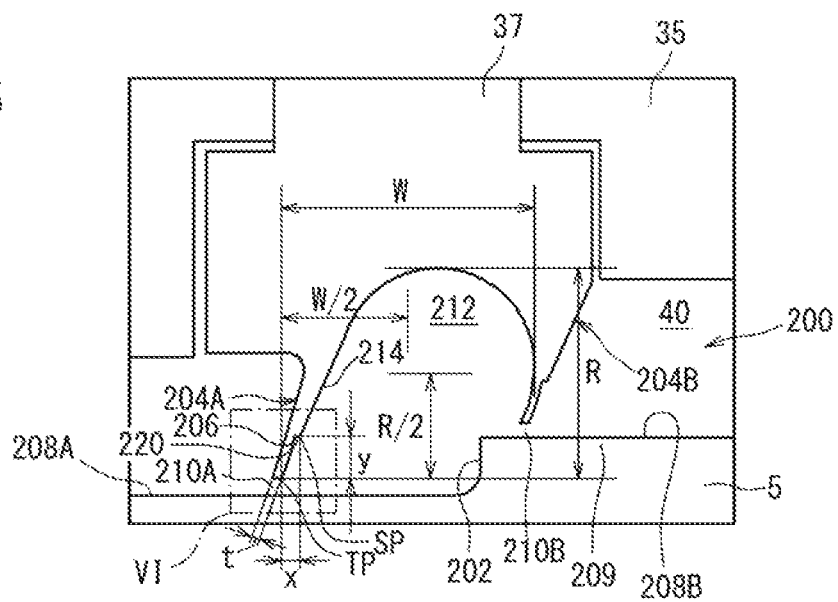
FIG. 5 is an enlarged meridional cross-sectional view schematically showing region V in FIG. 2.
Figure 6:
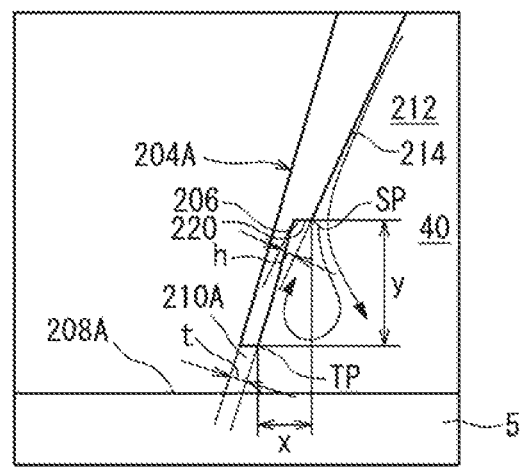
FIG. 6 is an enlarged view of region VI in FIG. 5.
Figure 7:
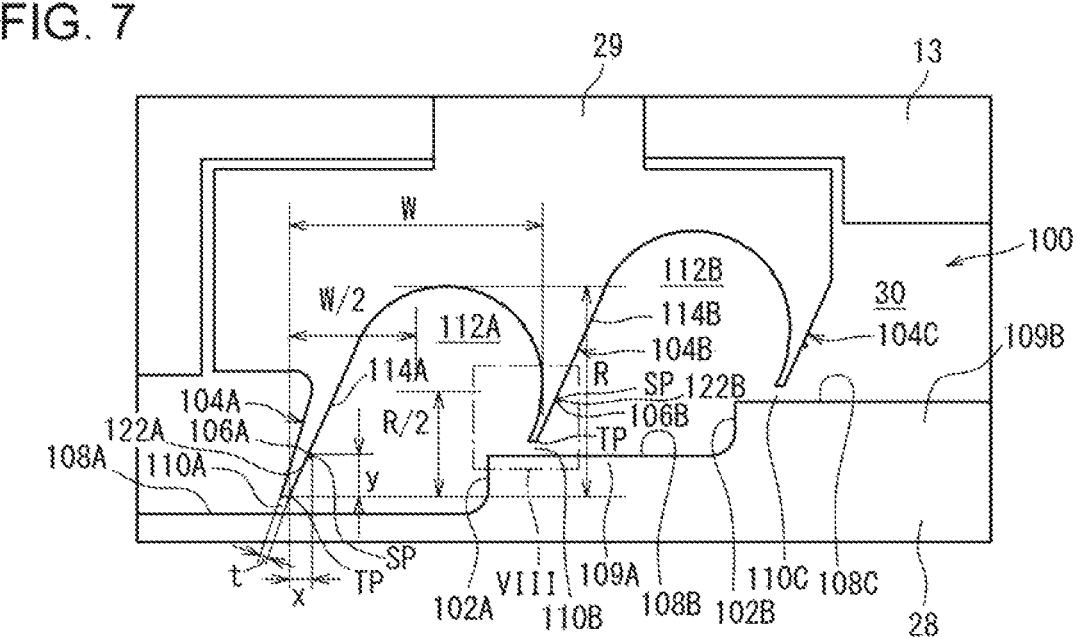
FIG. 7 is a diagram of the turbine 1 according to some embodiments, corresponding to FIG. 3.
Figure 8:
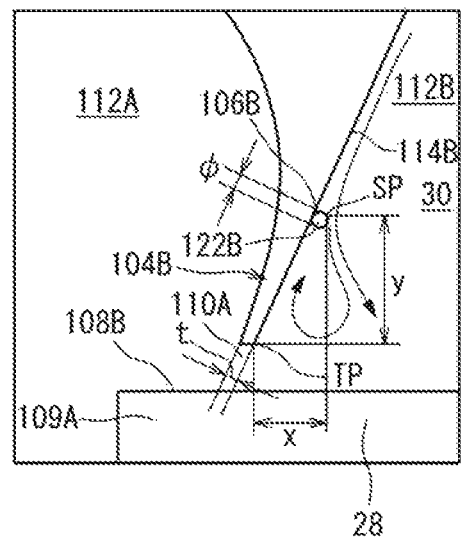
FIG. 8 is an enlarged view of region VIII in FIG. 7.
Figure 9:
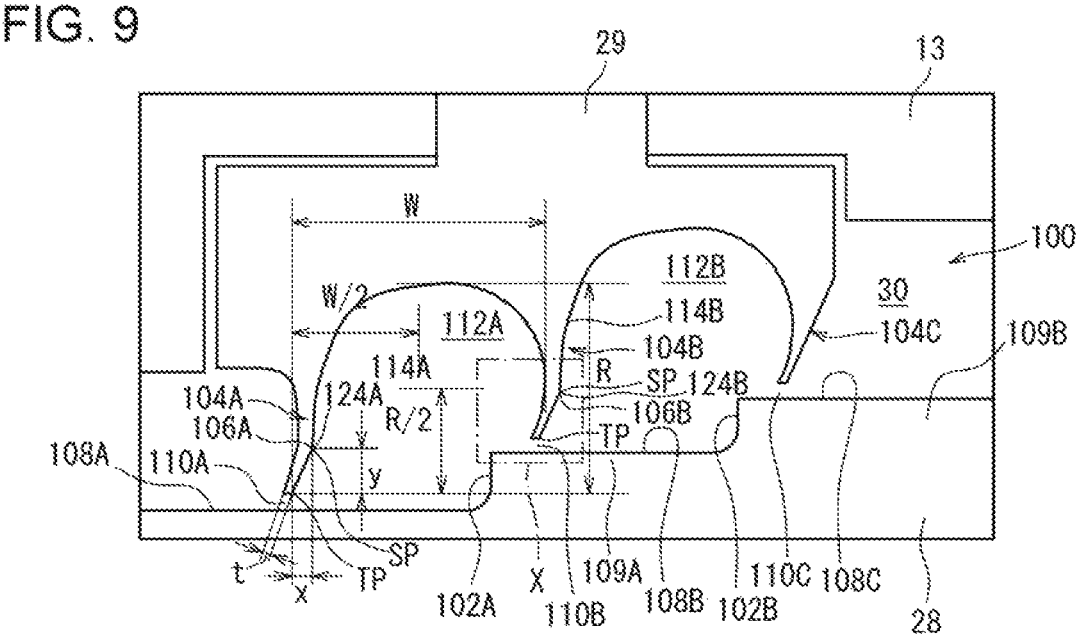
FIG. 9 is a diagram of the turbine 1 according to some embodiments, corresponding to FIG. 3.
Figure 10:
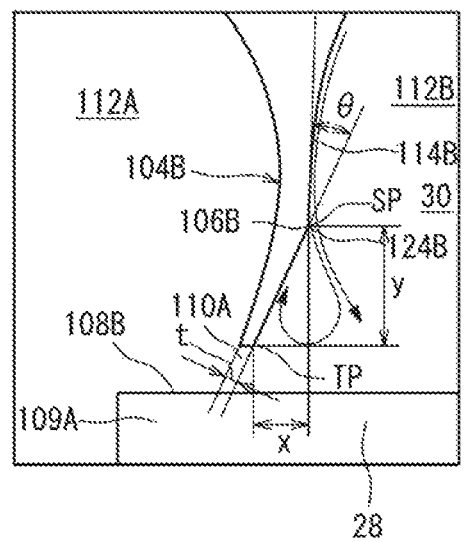
FIG. 10 is an enlarged view of region X in FIG. 9.
Figure 15:
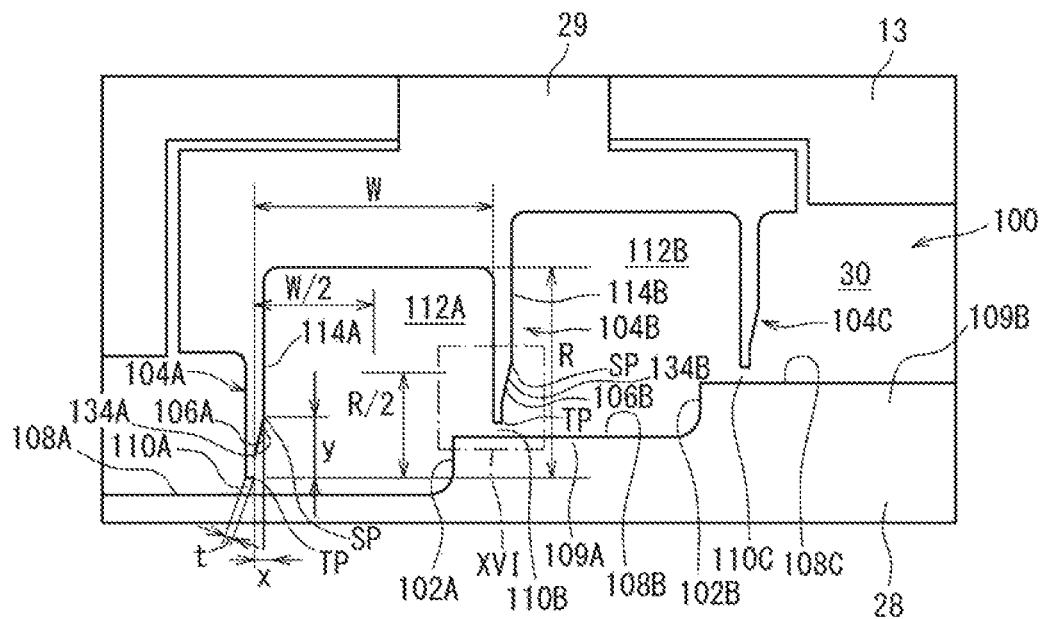
FIG. 15 is a diagram of the turbine 1 according to some embodiments, corresponding to FIG. 3.
Figure 16:
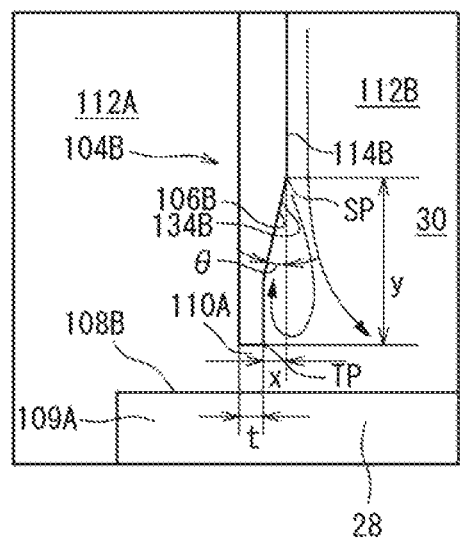
FIG. 16 is an enlarged view of region XVI in FIG. 15.
Figure 17:
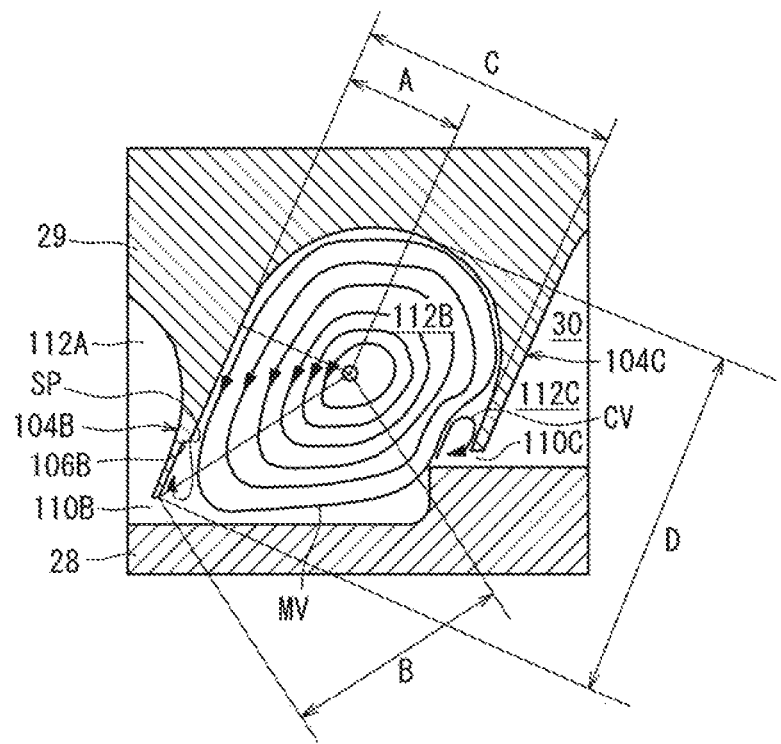
FIG. 17 is a diagram for describing the vortex structure in the cavity.
Figure 18:
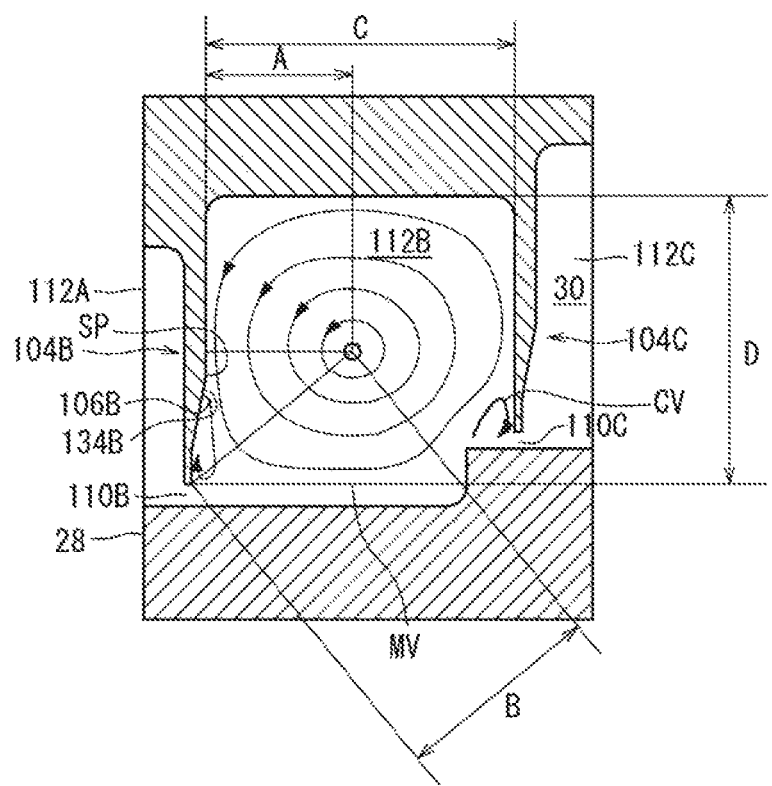
FIG. 18 is a diagram for describing the vortex structure in the cavity.

FIG. 3 is an enlarged meridional cross-sectional view schematically showing region III in FIG. 2. FIG. 4 is an enlarged view of region IV in FIG. 3. FIG. 5 is an enlarged meridional cross-sectional view schematically showing region V in FIG. 2. FIG. 6 is an enlarged view of region VI in FIG. 5. FIGS. 7, 9 and 15 are diagrams corresponding to FIG. 3 of the turbine 1 according to some embodiments. FIGS. 8, 10, and 16 are an enlarged view of region VIII in FIG. 7, region X in FIG. 9, and region XVI in FIG. 14, respectively. FIGS. 11 to 14 are diagrams of the turbine 1 according to some embodiments, corresponding to FIG. 4. FIGS. 17 and 18 are diagrams for describing the vortex structure in the cavity.

As shown in FIGS. 3, 5, 7, 9, and 15, the seal devices 100, 200 include at least one step surface 102 (102A, 102B), 202, at least two seal fins 104 (104A, 104B, 104C), 204 (204A, 204B), and a separation enhancing portion 106 (106A, 106B), 206.

With regard to groups of reference signs with parentheses, only the signs in the parentheses are shown in the drawings, and the signs in front of the parentheses are not shown. The signs in front of the parentheses are used in the specification to refer collectively to one of more of the signs in the parentheses.

The step surface 102 is disposed on a radially outer surface of the rotor blade 22 facing the first radial-directional clearance 30, while facing upstream in the flow direction of the fluid and dividing the radially outer surface of the rotor blade 22 into at least two sections 108 (108A, 108B, 108C) in the axial direction of the rotor 5.

Specifically, the sections 108 are connected via the step surfaces 102, and the sections 108B, 108C disposed downstream in the flow direction of the fluid are disposed on the outer side, in the radial direction, of the upstream sections 108A, 108B. The sections 108B, 108C are formed by step portions 109 (109A, 109B) having the step surfaces 102 and protruding in the radial direction from the sections 108A, 108B.

The step surface 202 is disposed on an outer peripheral surface of the rotor 5 facing the second radial-directional clearance 40, while facing upstream in the flow direction of the fluid and dividing the outer peripheral surface of the rotor 5 into at least two sections 208 (208A, 208B) in the axial direction of the rotor 5.

In other words, the sections 208 are connected via the step surface 202, and the section 208B disposed downstream in the flow direction of the fluid is disposed on the outer side, in the radial direction, of the upstream section 208A. The section 208B is formed by a step portion 209 having the step surface 202 and protruding in the radial direction from the section 208A.

The at least two seal fins 104 protrude toward the at least two respective sections 108 from the surrounding member surrounding the rotor blades 22, that is, the blade ring 13, and face the at least two sections 108 via seal gaps 110 (110A, 100B). The at least two seal fins 104 form cavities 112 (112A, 112B) between each other. The seal gap 110 is disposed away from the step surface 102 in the axial direction, and the cavity 112 extends over the at least one step surface 102 in the axial direction of the rotor 5.

The at least two seal fins 204 protrude toward the at least two respective sections 208 from the stationary vane 20, and face the at least two sections 208 via seal gaps 210 (210A, 210B). The at least two seal fins 204 form a cavity 212 between each other. The seal gap 210 is disposed away from the step surface 202 in the axial direction, and the cavity 212 extends over the at least one surface 202 in the axial direction of the rotor 5.

The separation enhancing portion 106, 206 is disposed on the downstream surface of the seal fin 104, 204 in the flow direction of the fluid in the first radial-directional clearance 30 or the second radial-directional clearance 40, and configured to separate the flow of the fluid along the downstream surface 114 (114A, 114B), 214.

In the above configuration, the cavity 112, 212 between the seal fins 104, 204 extends in the axial direction over the step surface 102, 202, and thus a main vortex MV is formed on the upstream side inside the cavity 112, 212, and a separation vortex CV is formed on the downstream side, as shown in FIG. 17.

In the above configuration, the separation enhancing portion 106, 206 disposed on the downstream surface 114, 214 of the seal fin 104, 204 determines the separation point SP at which the flow of the fluid along the downstream surface 114, 214 of the seal fin 104, 204 separates. The position of the separation point SP in the meridional plane is determined, and thereby variation of the position of the separation point SP in the circumferential direction is prevented, and a velocity change (secondary flow) in the circumferential direction in the cavity 112, 212 between the seal fins 104, 204 is suppressed. As a result, the flow site of the cavity 112, 212 becomes uniform in the circumferential direction, and it is possible to strengthen the main vortex MV and the separation vortex CV in the cavity 112, 212, thereby improving the contraction-flow effect and reducing the leakage flow through the seal gap 110, 210.

In some embodiments, the separation point SP extends continuously in an annular shape in the circumferential direction of the rotor 5, and is disposed concentrically with the rotor 5.

In some embodiments, as shown in FIGS. 3, 5, 7, 9, and 15, relationships represented by the following two expressions $$0 < x \leq W/2$$

$$t \leq y \leq R/2$$

are satisfied, provided that W is a distance along the axial direction of the rotor 5 from a tip TP of the downstream surface 114, 214 of the seal fin 104, 204 to a farthest portion of the cavity 112, 212 in the axial direction, R is a distance along the radial direction of the rotor 5 from the tip of the downstream surface 114, 214 of the seal fin 104, 204 to a farthest portion of the cavity 112, 212 in the radial direction, t is the thickness at the tip of the seal fin 104, 204, x is a distance along the axial direction of the rotor 5 from the tip TP of the downstream surface 114, 214 of the seal fin 104, 204 to a shape change point of the separation enhancing portion 106, 206 that causes separation of the flow of the fluid, and y is a distance along the radial direction of the rotor 5 from the tip TP of the downstream surface 114, 214 of the seal fin 104, 204 to a shape change point of the separation enhancing portion 106, 206.

With the above configuration, the distance x is less than a half of the distance W, and the distance y is less than a half of the distance R. Accordingly, the separation enhancing portion 106, 206 can cause separation of the flow of the fluid along the downstream surface 114, 214 of the seal fin 104, 204 without preventing generation of the main vortex MV and the separation vortex CV in the cavity 112, 212. As a result, it is possible to maximize the strength of the main vortex MV and the separation vortex CV in the cavity 112, 212, thereby improving the contraction-flow effect and reducing the leakage flow through the seal gap 110, 210.

The thickness t of the tip of the seal fin 104, 204 is a distance between a tangent to the downstream surface 114, 214 at the tip of the downstream surface 114, 214 of the seal fin 104, 204 and a parallel line parallel to the tangent and passing through the tip of the upstream surface of the seal fin 104, 204.

Furthermore, the shape change point is a point of shape change that causes separation of the flow of the fluid at the separation enhancing portion 106, 206, and normally coincides with the separation point SP. Thus, hereinafter, the shape change point is also referred to as the separation point SP.

In some embodiments, as shown in FIGS. 3 to 6, the separation enhancing portion 106, 206 is formed by a backward step surface 120 (120A, 120B) disposed on the downstream surface 114, 214 of the seal fin 104, 204 and facing the protruding direction of the seal fin 104, 2014.

With the above configuration, it is possible to separate the flow of the fluid along the downstream surface 114, 214 of the seal fin 104, 204 with the backward step surface 120, 220.

In some embodiments, as shown in FIGS. 4 and 6, provided that t is the thickness at the tip of the seal fin 104, 204 and h is the height of the backward step surface 120, 220, a relationship expressed by the following expression $$0.5 \leq h/t \leq 10$$

is satisfied.

With the above configuration, the ratio h/t of the height h of the backward step surface 120, 220 to the thickness t at the tip of the seal fin 104, 204 is not less than 0.5, and thus the flow of the fluid can feel the presence of the backward step surface 120, which makes it possible to separate the flow of the fluid reliably at the backward step surface 120, 220. Furthermore, with the ratio h/t being not more than 10, it is possible to suppress pressure loss due to separation, and to prevent a decrease in the strength of the main vortex MV and the separation vortex CV.

Furthermore, in a case where the separation enhancing portion 106, 206 comprises the backward step surface 120, 220, the separation point SP is formed by an intersection line between the root side of the seal fin 104, 204 and the backward step surface 120, 220. The backward step surface 120, 220 is an annular surface extending in the circumferential direction of the rotor 5, while the height h of the backward step surface 120, 220 is a distance between a tangent to the downstream surface 114, 214 at the separation point SP and a parallel line parallel to the tangent and passing through an intersection of the backward step surface 120, 220 and the tip side of the downstream surface 114, 214.

In some embodiments, as shown in FIGS. 4 and 6, the seal fin 104, 204 is divided into a tip side and a root side by the backward step surface 120, 220, and the thickness of the tip side of the seal fin 104 is smaller than the thickness of the root side.

In some embodiments, as shown in FIGS. 7 and 8, the separation enhancing portion 106, 206 is formed by a thread member 122 (122A, 122B) fixed to the downstream surface 114, 214 of the seal fin 104, 204, such as wire.

With the above configuration, it is possible to separate the flow of the fluid along the downstream surface 114, 214 of the seal fin 104 with the thread member 122.

In a case where the separation enhancing portion 106, 206 comprises the thread member 122, a part of the outer peripheral surface of the thread member 122 forms the separation point SP. The thread member 122 extends in an annular shape in the circumferential direction of the rotor 5 along the seal fin 104, 204, and can be fixed to the seal fin 104, 204 by welding, for instance.

In some embodiments, as shown in FIG. 8, provided that t is the thickness at the tip of the seal fin 104, 204 and φ is the diameter of the thread member 122, a relationship expressed by the following expression $$0.5 \leq \varphi/t \leq 10$$

is satisfied.

With the above configuration, the ratio φ/t of the diameter φ of the thread member 122 to the thickness t at the tip of the seal fin 104, 204 to is not less than 0.5, and thus the flow of the fluid can feel the presence of the thread member 122, which makes it possible to separate the flow of the fluid reliably at the thread member 122. Furthermore, with the ratio φ/t being not more than 10, it is possible to suppress pressure loss due to separation, and to prevent a decrease in the strength of the main vortex MV and the separation vortex CV.

In some embodiments, as shown in FIGS. 9 and 10, the separation enhancing portion 106, 206 is formed by a bend portion 124 (124A, 124B) at which the root side and the tip side of the downstream surface 114, 214 of the seal fin 104, 204 intersect with each other at different gradients from each other.

With the above configuration, it is possible to separate the flow of the fluid along the downstream surface 114, 214 of the seal fin 104, 204 with the bend portion 124.

In some embodiments, at the bend portion 124, the root side and the tip side of the downstream surface 114, 214 of the seal fin 104 intersect with each other at an angle θ of not less than 7° and not more than 45°.

With the above configuration, the root side and the tip side of the downstream surface 114, 214 of the seal fin 104, 204 intersect with each other at the bend portion 124 at an angle θ of not less than 7°, and thus the flow of the fluid can feel the presence of the bend portion 124, which makes it possible to separate the flow of the fluid reliably at the bend portion 124. Furthermore, with the angle being not more than 45°, it is possible to suppress pressure loss due to separation, and to prevent a decrease in the strength of the main vortex MV and the separation vortex CV.

If the separation enhancing portion 106, 206 comprises the bend portion 124, the separation point SP is an intersection line of the root side and the tip side of the downstream surface 114, 214 of the seal fin 104, 204, extending in annular shape in the circumferential direction of the rotor 5. The angle θ is an angle formed by a root-side tangent and a tip-side tangent at the position of the intersection line.

Figure 11:
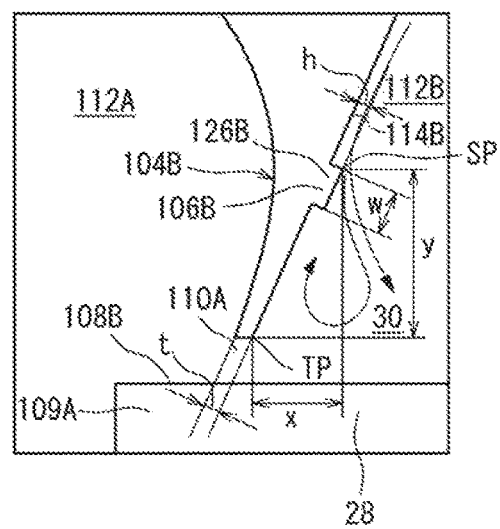
FIG. 11 is a diagram of the turbine 1 according to some embodiments, corresponding to FIG. 4.

In some embodiments, as shown in FIG. 11, the separation enhancing portion 106, 206 is formed by a protrusion 126B protruding from the downstream surface 114, 214 of the seal fin 104, 204.

With the above configuration, it is possible to separate the flow of the fluid along the downstream surface 114, 214 of the seal fin 104, 204 with the protrusion 126B.

In some embodiments, as shown in FIG. 11, relationships expressed by the following expressions $$0.5 \leq w/t$$

$$0.5 \leq h/t \leq 10$$

are satisfied, provided that t is the thickness at the tip of the seal fin 104, 204, w is the length of the protrusion 126B of the downstream surface 114, 214 of the seal fin 104, 204, and h is the protruding height of the protrusion of the downstream surface 114, 214 of the seal fin 104, 204.

With the above configuration, the ratio w/t of the length w of the protrusion 126B to the thickness t at the tip of the seal fin 104, 204 is not less than 0.5 and the ratio h/t of the protruding height h of the protrusion 126B to the thickness t at the tip of the seal fin 104, 204 is not less than 0.5, and thus the flow of the fluid can feel the presence of the protrusion 126B, which makes it possible to separate the flow of the fluid reliably at the protrusion 126B. Furthermore, with the ratio h/t being not more than 10, it is possible to suppress pressure loss due to separation, and to prevent a decrease in the strength of the main vortex MV and the separation vortex CV.

In some embodiments, the ratio w/t of the length w of the protrusion 126B to the thickness t at the tip of the seal fin 104, 204 is not more than 10.

In some embodiments, the protrusion 126B extends in annular shape in the circumferential direction of the rotor 5, and has a rectangular cross section in a direction perpendicular to the circumferential direction. The protrusion 126B has side walls on the root side and the tip side of the seal fin 104. An outer surface of the protrusion 126B extends parallel to the downstream surface 114 of the seal fin 104 between the side walls. In this case, the separation point SP comprises an annular intersection line at which the outer surface and the root-side side wall of the protrusion 126B intersect with each other. The height h of the protrusion 126B is a distance between a tangent to the downstream surface 114 of the seal fin 104 at an intersection position at which the root side of the downstream surface 114 of the seal fin 104 and the side wall of the protrusion 126B intersect with each other, and a parallel line parallel to the tangent and passing through the separation point SP.

Figure 12:
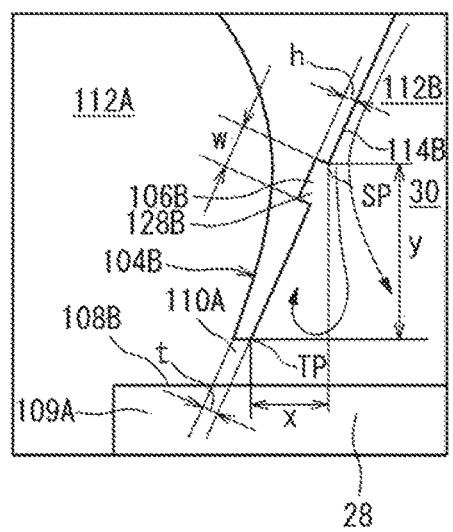
FIG. 12 is a diagram of the turbine 1 according to some embodiments, corresponding to FIG. 4.

In some embodiments, as shown in FIG. 12, the separation enhancing portion 106, 206 is formed by a groove 128B that has an opening into the downstream surface 114, 214 of the seal fin 104, 204.

With the above configuration, it is possible to separate the flow of the fluid along the downstream surface 114, 214 of the seal fin 104, 204 with the groove 128B.

In some embodiments, relationships expressed by the following two expressions $$h \le w$$

$$0.5 \le h/t \le 10$$

are satisfied, provided that t is the thickness at the tip of the seal fin 104, 204, w is the width of the opening of the groove 128B along the downstream surface 114, 214 of the seal fin 104, 204, and h is the depth of the groove 128B.

With the above configuration, the width w of the opening of the groove 128B is not less than the depth h of the groove 128B and the ratio h/t of the depth h of the groove 128B to the thickness t at the tip of the fin 104, 204 is not less than 0.5, and thus the flow of the fluid can feel the presence of the groove 128B, which makes it possible to separate the flow of the fluid reliably at the groove 128B. Furthermore, with the ratio h/t being not more than 10, it is possible to suppress pressure loss due to separation, and to prevent a decrease in the strength of the main vortex MV and the separation vortex CV.

In some embodiments, the groove 128B extends in annular shape in the circumferential direction of the rotor 5, and has a rectangular cross section in a direction perpendicular to the circumferential direction. The groove 128B has side walls on the root side and the tip side of the seal fin 104. A bottom surface of the groove 128B extends parallel to the downstream surface 114 of the seal fin 104 between the side walls. In this case, the separation point SP comprises an annular intersection line at which the side wall of the groove 128B and the root side of the downstream surface 114, 214 of the seal fin 104, 204 intersect with each other. The depth h of the groove 128B is a distance between a tangent to the downstream surface 114 of the seal fin 104 at the separation point SP and a parallel line parallel to the tangent and passing through the position at which the bottom surface of the groove 128 and the side wall of the groove 128B on the root side of the seal fin 104 intersect with each other.

Figure 13:
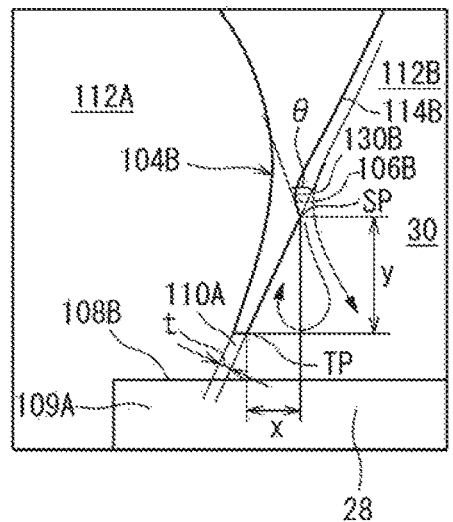
FIG. 13 is a diagram of the turbine 1 according to some embodiments, corresponding to FIG. 4.

In some embodiments, as shown in FIG. 13, the separation enhancing portion 106, 206 is formed by a recessed portion 130B formed on the downstream surface 114, 214 of the seal fin 104, 204.

With the above configuration, it is possible to separate the flow of the fluid along the downstream surface 114, 214 of the seal fin 104, 204 with the recessed portion 130B.

In some embodiments, the wall surface of the recessed portion 130B and the tip side of the seal fin 104, 204 intersect with each other at an angle θ of not less than 7°. Herein, the wall surface of the recessed portion 130B comprises the root side of the downstream surface 114 of the seal fin 104, 204, and is curved so as to be recessed from the tip side of the downstream surface 114.

In the above configuration, the wall surface of the recessed portion 130B and the tip side of the seal fin 104, 204 intersect with each other at an angle θ of not less than 7°, and thereby the flow of the fluid can feel the presence of the boundary between the wall surface of the recessed portion 130B and the tip side of the seal fin 104, 204, that is the presence of the separation point SP, which makes it possible to separate the flow of the fluid reliably with the recessed portion 130B.

Furthermore, as shown in FIG. 17, if the flow path width of the fluid flowing toward the tip of the seal fin 104, 204 increases gradually along the downstream surface 114, 214 of the seal fin 104, 204, the velocity of the fluid flowing along the downstream surface 114, 214 gradually decreases. When the velocity of the fluid is low, the separation point SP is not stable, and a pressure gradient is likely to be created in the circumferential direction inside the cavity 112, 212. As a result, the secondary flow in the circumferential direction occurs.

In this regard, with the above configuration, the recessed portion 130B is formed on the downstream surface 114, 214 of the seal fin 104, 204, and thereby the increasing rate of the flow path width of the fluid flowing toward the tip of the seal fin 104, 204 along the downstream surface 114, 214 can be reduced, which makes it possible to suppress reduction of the flow velocity. Accordingly, formation of an uneven pressure gradient in the circumferential direction inside the cavity 112, 212 is suppressed, and thus generation of the secondary flow in the circumferential direction is suppressed, which makes it possible to prevent a decrease in the strength of the main vortex MV and the separation vortex CV inside the cavity 112, 212.

As shown in FIGS. 17 and 18, the increase rate of the flow path width of the fluid flowing toward the tip of the seal fin 104, 204 along the downstream surface 114, 214 can be expressed by B/A, which is a ratio of the distance B to the distance A, provided that A is the distance between the vortex center and the downstream surface 114, and B is the distance between the vortex center and the seal gap 110B. As shown in FIGS. 17 and 18, the increase rate B/A of the flow path width increases with an increase in the gradient of the seal fin 104, 204 with respect to the radial direction of the rotor 5.

In some embodiments, the upper limit of the angle θ at which the wall surface of the recessed portion 130B and the tip side of the seal fin 104, 204 intersect with each other is set taking account of the strength of the seal fin 104, 204.

Figure 14:
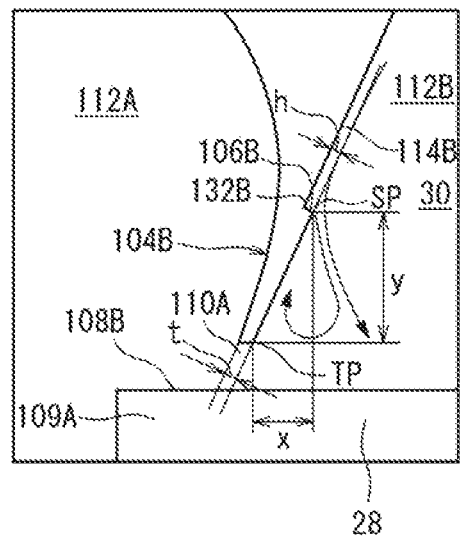
FIG. 14 is a diagram of the turbine 1 according to some embodiments, corresponding to FIG. 4.

In some embodiments, as shown in FIG. 14, the separation enhancing portion 106, 206 is formed by a forward step surface 132B disposed on the downstream surface 114, 214 of the seal fin 104, 204 and facing the opposite direction to the protruding direction of the seal fin 104, 204.

In the above configuration, it is possible to separate the flow of the fluid along the downstream surface 114, 214 of the seal fin 104, 204 with the forward step surface 132B.

In some embodiments, a relationship expressed by the following expression $$0.5 \le h/t \le 10$$

is satisfied, provided that t is the thickness at the tip of the seal fin 104, 204, and h is the height of the forward step surface 132B.

With the above configuration, the ratio h/t of the height h of the forward step surface 132B to the thickness t at the tip of the seal fin 104, 204 is not less than 0.5, and thus the flow of the fluid can feel the presence of the forward step surface 132B, which makes it possible to separate the flow of the fluid reliably at the forward step surface 132B. Furthermore, with the ratio h/t being not more than 10, it is possible to suppress pressure loss due to separation, and to prevent a decrease in the strength of the main vortex MV and the separation vortex CV.

Furthermore, in a case where the separation enhancing portion 106, 206 comprises the forward step surface 132B, the separation point SP is formed by an intersection line between the root side of the seal fin 104, 204 and the forward step surface 132B. The forward step surface 132B is an annular surface extending in the circumferential direction of the rotor 5, and the height h of the forward step surface 132B is a distance between a tangent to the downstream surface 114, 214 at an intersection position between the root side of the downstream surface 114, 214 and the forward step surface 132B, and a parallel line parallel to the tangent and passing through the separation point SP.

In some embodiments, as shown in FIGS. 3 to 14, the seal fin 104, 204 extends inclined with respect to the radial direction of the rotor 5.

With the above configuration, the seal fin 104, 204 is inclined with respect to the radial direction of the rotor 5, and thereby the flow-contraction effect is increased, which makes it possible to further reduce a leakage flow of the fluid flowing through the seal gap 110, 210.

Furthermore, if the seal fin 104, 204 is inclined with respect to the radial direction of the rotor 5, the flow path width of the fluid along the downstream surface 114, 214 of the seal fin 104, 204 increases toward the tip and the velocity of the fluid decreases, as shown in FIG. 17. When the velocity of the fluid is low, the separation point SP is not stable, and a pressure gradient is likely to be created in the circumferential direction inside the cavity 112, 212. As a result, the secondary flow in the circumferential direction occurs.

Furthermore, the seal fin 104, 204 is inclined with respect to the radial direction of the rotor 5, and thereby the aspect ratio inside the cavity 112, 212 increases, so that the main vortex MV inside the cavity 112, 212 has a shape elongated in the radial direction. The main vortex MV having an elongated shape has a characteristic to become closer to a true circular shape. Thus, the center of the main vortex MV is likely to move and the vortex structure tends to be unstable.

In this regard, with the above configuration (17), the separation point SP is determined by the separation enhancing portion 106, 206, and thereby the vortex structure in the meridional plane is stabilized, which suppresses creation of an uneven pressure gradient in the circumferential direction, and prevents occurrence of the secondary flow in the circumferential direction. Accordingly, it is possible to fully benefit from the merit of increasing the flow-contraction effect with the seal fin 104, 204 inclined with respect to the radial direction of the rotor 5, and to reduce a leakage flow.

As shown in FIGS. 17 and 18, the aspect ratio inside the cavity 112, 212 is a ratio D/C, provided that C is the width of the cavity 112, 212 along the axial direction of the rotor 5 taking account of the gradient of the seal fin 104, 204 with respect to the radial direction of the rotor 5, and D is the height of the cavity 112, 212 along the radial direction of the rotor 5 taking account of the gradient of the seal fin 104, 204 with respect to the radial direction of the rotor 5.

In some embodiments, as shown in FIGS. 3 to 14, the seal fin 104, 204 extends inclined with respect to the radial direction of the rotor 5, so that the tip side is disposed upstream of the root side in the flow direction of the fluid flowing through the seal gap 110, 210.

In some embodiments, as shown in FIGS. 15 and 16, the seal fin 104, 204 extends in the radial direction of the rotor 5.

In some embodiments, as shown in FIGS. 15 and 16, the separation enhancing portion 106, 206 is formed by an inclined surface 134 (134A, 134B).

With the above configuration, it is possible to separate the flow of the fluid along the downstream surface 114, 214 of the seal fin 104, 204 with the inclined surface 134.

In some embodiments, the inclined surface 134 is inclined so that the tip side of the seal fin 104, 204 is thinner than the root side. In this case, the separation point SP comprises a intersection line at which the downstream surface 114, 214 of the seal fin 104, 204 and the inclined surface 134 intersect with each other.

In some embodiments, the downstream surface 114, 214 of the seal fin 104, 204 and the inclined surface 134 form an inclination angle θ of not less than 7° and not more than 45°.

With the above configuration, the inclination angle θ is not less than 7°, and the flow of the fluid can feel the presence of the inclined surface 134, which makes it possible to separate the flow of the fluid reliably at the inclined surface 134. Furthermore, with the angle being not more than 45°, it is possible to suppress pressure loss due to separation, and to prevent a decrease in the strength of the main vortex MV and the separation vortex CV.

Embodiments of the present invention were described in detail above, but the present invention is not limited thereto, and various amendments and modifications may be implemented.

For instance, the shroud 35 is not limited to an integral shroud, and may be an inner ring constituting a diaphragm. That is, the turbine 1 is not limited to a reaction turbine, and may be an impulse turbine.

Further, for instance, the turbine 1 is not limited to a mid-pressure steam turbine, and may be a high-pressure or low-pressure turbine. The turbine 1 may be of a single flow type. Further, the turbine 1 may be a gas turbine, and its working fluid is not limited to steam.

DESCRIPTION OF REFERENCE NUMERALS

1 Turbine
3 Casing
3a Steam inlet
3b Steam outlet
5 Rotor
7 Radial bearing
9 Rotor blade row
13 Blade ring
14 Blade ring
16 Stationary vane row
18 Inner flow passage
20 Stationary vane
22 Rotor blade
23 Generator
24 Blade groove
26 Blade root portion
27 Blade body (blade profile portion)
28 Shroud
29 Seal member 30 Radial-directional clearance (first radial-directional clearance)
32 Vane groove
33 Vane root portion
35 Shroud (hub shroud)
34 Vane body (vane profile portion)
37 Seal member
40 Radial-directional clearance (second radial-directional clearance)
100 Seal device
102 (102A, 102B) Step surface
104 (104A, 104B, 104C) Seal fin
106 (106A, 106B) Separation enhancing portion
108 (108A, 108B) Section
109 (109A, 109B) Step portion
110 (110A, 110B) Seal gap
112 (112A, 112B) Cavity
114 (114A, 114B) Downstream surface
120 (120A, 120B) Backward step surface
122 (122A, 122B) Thread member
124 (124A, 124B) Bend portion
126B Protrusion
128B Groove
130B Recessed portion
132B Froward step surface
134 (134A, 134B) Inclined surface
200 Seal device
202 Step surface
204 (204A, 204B) Seal fin
206 Separation enhancing portion
208 (208A, 208B) Section
209 Step portion
210 (210A, 210B) Seal gap
212 Cavity
214 Downstream surface
MV Main vortex
CV Separation vortex
SP Separation point (shape change point)
TP Tip of downstream surface of tip seal

The invention claimed is:

1. A turbine, comprising:
a casing;
a rotor extending inside the casing;
a plurality of rotor blades fixed to the rotor and arranged in a circumferential direction of the rotor;
a surrounding portion fixed to the casing and surrounding the plurality of rotor blades via a first radial-directional gap;
a plurality of stationary vanes fixed to the casing and arranged in the circumferential direction of the rotor so as to have a second radial-directional gap from an outer peripheral surface of the rotor; and
a seal device capable of restricting a flow of a fluid in the first radial-directional gap or the second radial-directional gap,
wherein the seal device includes:
at least one step surface disposed on a radially outer surface of the rotor blade facing the first radial-directional gap or on the outer peripheral surface of the rotor facing the second radial-directional gap, the at least one step surface facing upstream in a flow direction of the fluid and dividing the radially outer surface of the rotor blade or the outer peripheral surface of the rotor into at least two sections in an axial direction of the rotor;
at least two seal fins protruding toward the at least two sections, respectively, from the surrounding portion or the stationary vane, and facing the at least two sections via a seal gap, respectively, the at least two seal fins forming a cavity which extends over the at least one step surface in the axial direction of the rotor between each other; and
a separation enhancing portion disposed on a downstream surface of the seal fin in the flow direction of the fluid and configured to separate the flow of the fluid along the downstream surface,
wherein the separation enhancing portion comprises a collection of shape change points which form an annular line which extends continuously in the circumferential direction of the rotor and concentrically with the rotor.

2. The turbine according to claim 1,
wherein relationships expressed by following two expressions $$0 \le x \le W/2$$

$$t \le y \le R/2$$

are satisfied, provided that,
W is a distance along the axial direction of the rotor, from a tip of the downstream surface of the seal fin to a farthest portion of the cavity in the axial direction,
R is a distance along a radial direction of the rotor, from the tip of the downstream surface of the seal fin to a farthest portion of the cavity in the radial direction,
t is a thickness at the tip of the seal fin,
x is a distance along the axial direction of the rotor, from the tip of the downstream surface of the seal fin to a shape change point of the separation enhancing portion which causes separation of the flow of the fluid, and
y is a distance along the radial direction of the rotor, from the tip of the downstream surface of the seal fin to the shape change point of the separation enhancing portion.

3. The turbine according to claim 1,
wherein the separation enhancing portion is disposed on the downstream surface of the seal fin, and comprises a backward step surface which faces a protruding direction of the seal fin.

4. The turbine according to claim 3,
wherein a relationship expressed by a following expression $$0.5 \le h/t \le 10$$

is satisfied, provided that,
t is a thickness at a tip of the seal fin, and
h is a height of the backward step surface.

5. The turbine according to claim 1,
wherein the separation enhancing portion comprises a thread member fixed to the downstream surface of the seal fin.

6. The turbine according to claim 5,
wherein a relationship expressed by a following expression $$0.5 \le \varphi/t \le 10$$

is satisfied, provided that,
t is a thickness at a tip of the seal fin, and
φ is a diameter of the thread member.

7. The turbine according to claim 1,
wherein the separation enhancing portion comprises a bend portion at which a root side and a tip side of the downstream surface of the seal fin intersect with each other at different gradients from each other.

8. The turbine according to claim 7,
wherein, at the bend portion, the root side and the tip side of the downstream surface of the seal fin intersect with each other at an angle of not less than 7° and not more than 45°.

9. The turbine according to claim 1,
wherein the separation enhancing portion comprises a protrusion protruding from the downstream surface of the seal fin.

10. The turbine according to claim 9,
wherein relationships expressed by following two expressions $$0.5 \leq w/t$$

$$0.5 \leq h/t \leq 10$$

are satisfied, provided that,
t is a thickness at a tip of the seal fin,
w is a length of the protrusion along the downstream surface of the seal fin, and
h is a protruding height of the protrusion from the downstream surface of the seal fin.

11. The turbine according to claim 1,
wherein the separation enhancing portion comprises a groove which has an opening on the downstream surface of the seal fin.

12. The turbine according to claim 11,
wherein relationships expressed by following two expressions $$h \leq w$$

$$0.5 \leq h/t \leq 10$$

are satisfied, provided that,
t is a thickness at a tip of the seal fin,
w is a width of the opening of the groove along the downstream surface of the seal fin, and
h is a depth of the groove.

13. The turbine according to claim 1,
wherein the separation enhancing portion comprises a recessed portion formed on the downstream surface of the seal fin.

14. The turbine according to claim 13,
wherein a wall surface of the recessed portion and a tip side of the seal fin intersect with each other at an angle of not less than 7°.

15. The turbine according to claim 1,
wherein the separation enhancing portion is disposed on the downstream surface of the seal fin, and comprises a forward step surface facing an opposite direction to a protruding direction of the seal fin.

16. The turbine according to claim 15,
wherein a relationship expressed by a following expression $$0.5 \leq h/t \leq 10$$

is satisfied, provided that,
t is a thickness at a tip of the seal fin, and
h is a height of the forward step surface.

17. The turbine according to claim 1,
wherein the separation enhancing portion comprises an inclined surface disposed on the downstream surface of the seal fin and inclined so that a tip side of the seal fin is thinner than a root side of the seal fin.

18. The turbine according to claim 17,
wherein an inclination angle of the inclined surface is not less than 7° and not more than 45°.

19. The turbine according to claim 1,
wherein the seal fin extends inclined with respect to the radial direction of the rotor.

* * * * *